(12) United States Patent
Kloss et al.

(10) Patent No.: US 8,033,577 B2
(45) Date of Patent: Oct. 11, 2011

(54) FLARED SCREW FITTING

(75) Inventors: Alexander Kloss, Köln (DE); Michael Jahns, Euskirchen (DE); Alfons Schorn-Gilson, Swisttal-Odendorf (DE)

(73) Assignee: Eifeler Maschinenbau GmbH, Euskirchen (DE)

( * ) Notice: Subject to any disclaimer, the term of this patent is extended or adjusted under 35 U.S.C. 154(b) by 990 days.

(21) Appl. No.: 11/786,071

(22) Filed: Apr. 10, 2007

(65) Prior Publication Data

US 2007/0236016 A1 Oct. 11, 2007

(30) Foreign Application Priority Data

Apr. 10, 2006 (DE) .......................... 10 2006 017 087

(51) Int. Cl.
*F16L 25/00* (2006.01)
(52) U.S. Cl. ................ 285/334.5; 285/332.1; 285/332.2
(58) Field of Classification Search .......... 285/114–115, 285/332.1–332.2, 334.5
See application file for complete search history.

(56) References Cited

U.S. PATENT DOCUMENTS

| 406,060 | A | * | 7/1889 | Potts | 285/148.11 |
|---|---|---|---|---|---|
| 2,381,829 | A | | 8/1945 | Livers | |
| 2,444,622 | A | | 7/1948 | Wolfram | |
| 2,453,813 | A | * | 11/1948 | Prince | 285/89 |
| 3,265,413 | A | * | 8/1966 | Currie | 285/334.4 |
| 3,294,425 | A | * | 12/1966 | Franck | 285/334.5 |
| 5,271,647 | A | | 12/1993 | Usui | 285/328 |
| 5,354,107 | A | * | 10/1994 | Takikawa | 285/334.5 |
| 5,887,912 | A | * | 3/1999 | Nakamura | 285/334.5 |
| 2004/0036288 | A1 | * | 2/2004 | Wosik | 285/334.5 |

FOREIGN PATENT DOCUMENTS

DE 35 43 539 8/1986

* cited by examiner

*Primary Examiner* — Aaron Dunwoody
*Assistant Examiner* — Fannie Kee
(74) *Attorney, Agent, or Firm* — Collard & Roe, P.C.

(57) ABSTRACT

A flared screw fitting has a pipe expanded in an end section into a tulip flare. A connecting piece has a conical stop face situated on an end section, which is joined in the direction of a forward front face of the connecting piece by a groove. An internal mantle surface of a union element contacts an external mantle surface of the tulip flare in an area whose smallest diameter is larger than the smallest diameter of the stop face of the connecting piece. The union element may be provided with an external threaded section which works together with an internal threaded section of the connecting piece.

11 Claims, 6 Drawing Sheets

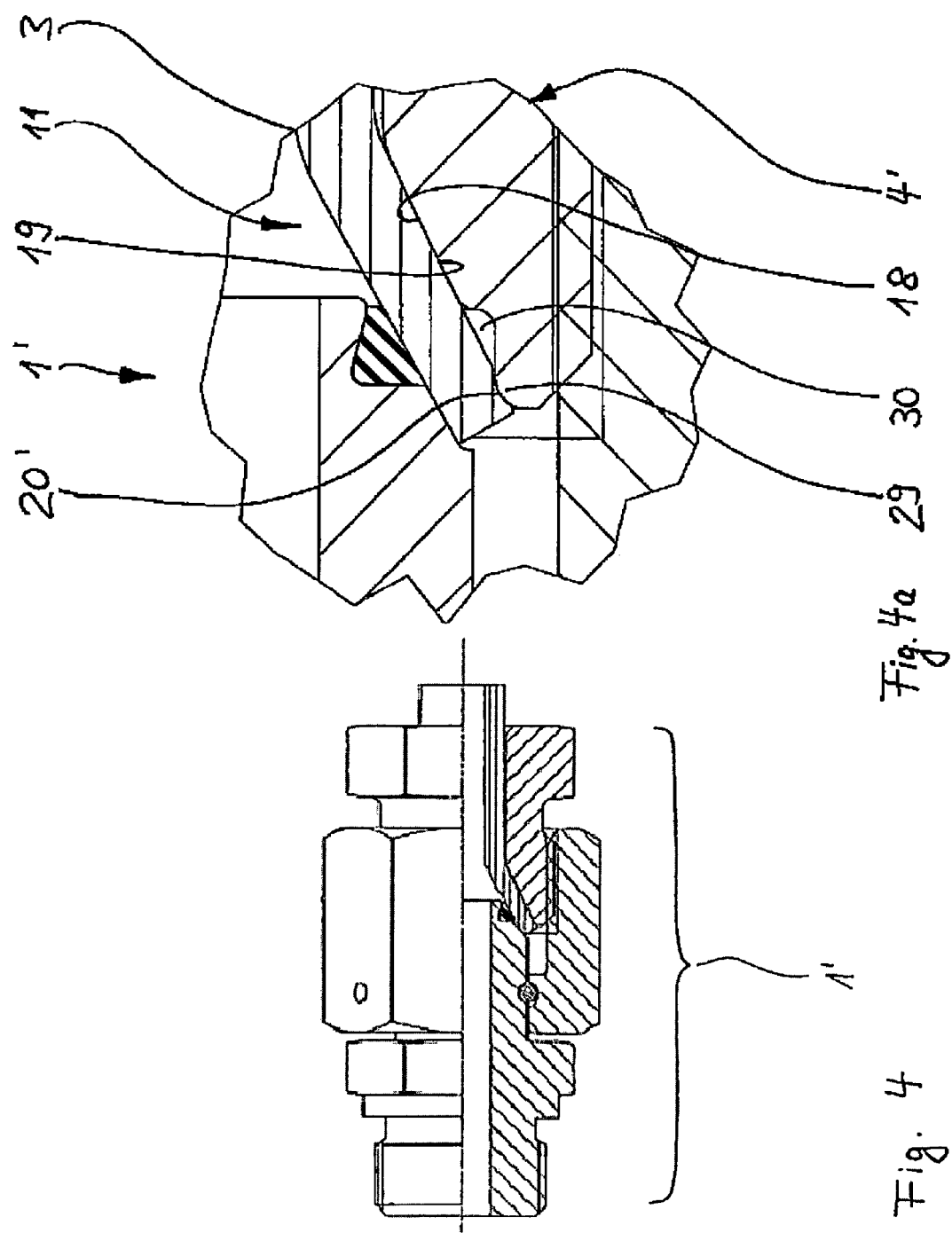

FLARED SCREW FITTING

CROSS REFERENCE TO RELATED APPLICATIONS

Figure 1:
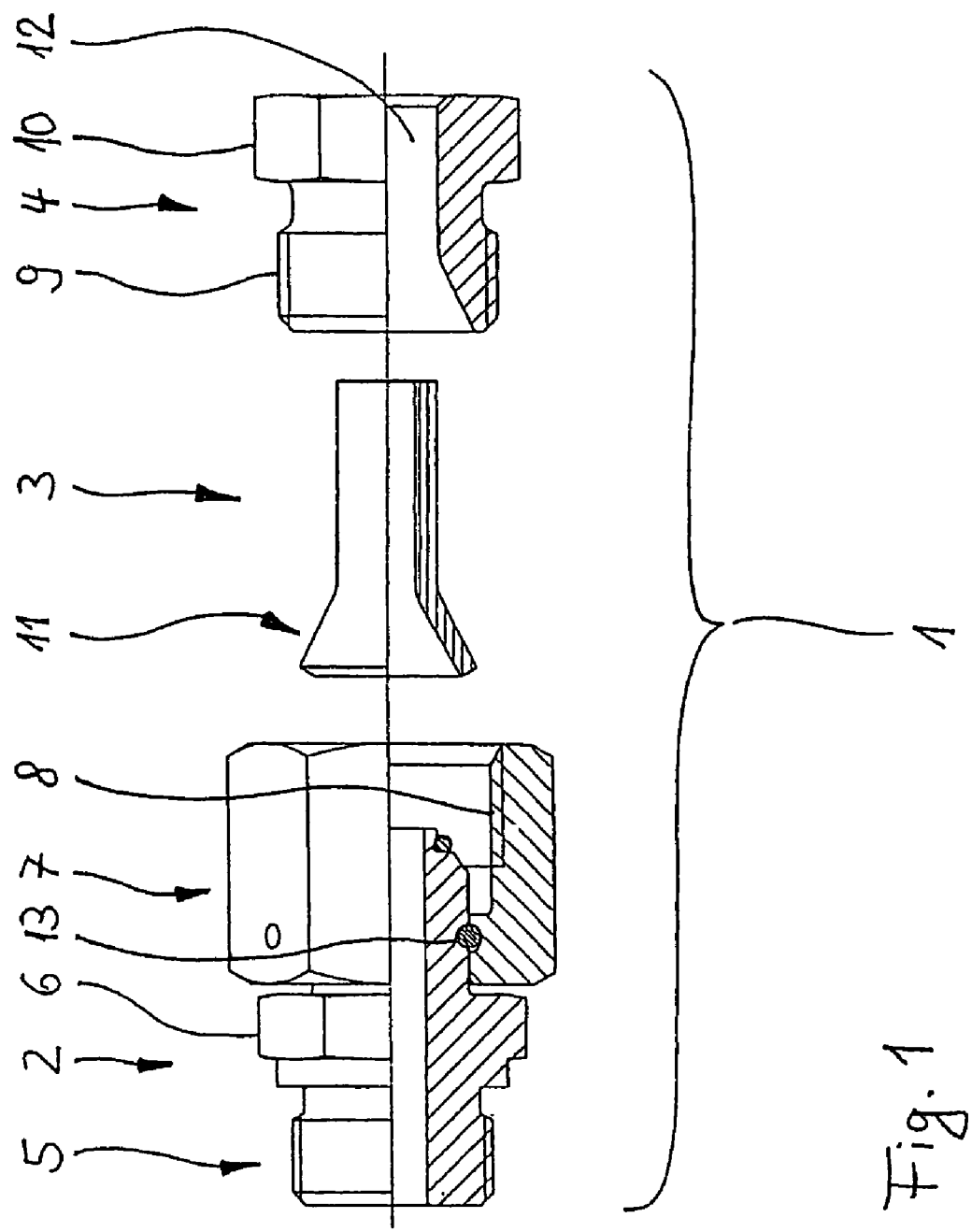

Applicant claims priority under 35 U.S.C. §119 of German Application No. 10 2006 017 087.3 filed Apr. 10, 2006.

The present invention relates to a flared screw fitting having a pipe expanded in an end section into a tulip flare, a connecting piece having a conical stop face situated on an end section, which adjoins a groove for an elastic sealing ring in the direction of a forward front face of the connecting piece and on which the pipe is supported by an internal mantle surface of the tulip flare, by which the sealing ring is pressed into the groove in the final mounted state of the screw fitting, furthermore, the tulip flare being able to be pressed against the stop face of the connecting piece using a union element engaging on its external mantle surface, which acts together via a threaded section with a corresponding threaded section on the connecting piece, in the course of tightening the screw fitting.

Flared screw fittings of this type have been generally known for some time and have fundamentally proven themselves. A special set of problems results if a flared pipe is to be connected to a connecting piece according to the so-called "British Standard" (BS), in which the stop face has a cone angle of 60°.

Typically, connecting pieces according to the British Standard of this type are connected to a pipe in such a way that a special molded part is welded onto the pipe. This molded part has a conical internal mantle surface on its side facing toward the connecting piece, which corresponds to the conical stop face of the connecting piece. Furthermore, the molded part has a section having an external thread as well as an external hexagon to hold onto. During production of a connection of this type, union nut located on the connecting piece in the form of a so-called twist-on wire connector is coupled by its internal thread to an external thread, which fits therewith, of the welded-on molded part, by which the molded part is pressed together with the pipe against the connecting piece, which produces a tight connection.

Although the principle of the welded-on molded part has fundamentally proven itself, a disadvantage is that the welded connection may only be produced with great effort, which makes production on location at a construction site impossible. Furthermore, it is necessary to examine each individual weld seam using x-rays after its production, to establish any leaks in a timely manner. Screw fittings of this type are typically used for high-pressure hydraulic systems having operating pressures up to approximately 630 bar. A further disadvantage of the welded connection is also that due to the welding, material embrittlement occurs, so that the connection does not always have the desired long-term strength, in particular in the event of a continuous oscillating strain.

Replacing the molded part attached using welding with a flared pipe is not possible without further measures because of the special geometry of the connecting piece standardized in the British Standard: in particular in the event of small diameters, the stop face of the connecting piece is very small, because the groove for the sealing ring has a specific minimum space requirement. In addition, the groove wall facing toward the front side of the connecting piece is only connected to the remaining connecting piece in the area of the groove base via a very small residual cross-section, so that fractures would occur here upon tightening of a connection having a typical flared pipe.

Object

The present invention is based on the object of being able to combine a connecting piece according to the British Standard having a sealing ring integrated in the stop face with a flared pipe, without the danger of material fractures arising upon tightening of the screw fitting.

Achievement of the Object

Starting from a flared screw fitting of the type described at the beginning, this object is achieved according to the present invention in that, in the hand-tight pre-mounted state of the screw fitting, an internal mantle surface of the union element only contacts the external mantle surface of the tulip flare in an area whose diameter is greater than the smallest diameter of the stop face.

In this way, starting from this pre-mounted state, upon further tightening of the screw fitting, force is introduced into the connection piece solely in the forward area, i.e. in the area of the stop face, and not in the area of the groove provided with the sealing ring and also not in the area of the groove wall adjoining it in the direction of the front face. Specifically, these areas are comparatively weak because of the special geometry of the standardized connecting piece, so that a force introduction there would result in excess deformation and even material fractures. According to the present invention, the tulip flare initially only comes into contact with the connecting piece at its forward section, i.e., in the area of the largest diameter, where supporting larger forces is noncritical.

According to the present invention, the force is introduced in an area of the connecting piece in which it has a high carrying capacity because of cross-sections having large dimensions. In this way, the "sensitive" area of the groove and the wall adjoining in the direction of the through hole in the connecting piece may be kept free of forces and torques.

Preferably, as the screw fitting is tightened further, there is also an advancing contacting of the external mantle surface of the tulip flare with the initially non-contacted area of the union element, i.e., where the groove for the sealing ring is located on the interior mantle surface of the tulip flare. In this way, the sealing ring is compressed sufficiently solidly and may thus unfold its seal effect completely. The contact in the area of the groove also results in a large-area force introduction from the union element into the tulip flare in the final mounted state, so that it is well secured against undesired movement. A contact between the edge of the groove wall facing toward the front side and the internal mantle surface of the tulip flare is also avoided in the final mounted state. The force is still transmitted from the tulip flare itself into the connecting piece primarily via the stop face of the connecting piece situated in the area of the large tulip flare diameter.

According to a preferred embodiment of the flared screw fitting according to the present invention, the union element is a union screw provided with an external thread, which works together with an internal thread of the connecting piece. However, as an alternative to this, it is also conceivable that the union element is a union nut provided with an internal thread, which works together with an external thread of the connecting piece.

In a refinement of the present invention, the connecting piece is constructed in two pieces and has an external union nut, which is rotatable around an internal main part and is coupled to the connecting piece to resist tensile strain via a wire ring which engages in a formfitting way in the union nut and the main part. This has the advantage that the union screw working together with the tulip flare does not have to be rotated as the screw fitting is tightened, but rather the rotation may be executed solely by the union nut. A twist-on wire connector offers the advantage that it remains rotatable even in the event of a connecting piece screwed solidly into a hydraulic block, for example.

If the union element is a union nut, it may be constructed in two parts and have an inner transmission ring rotatable in relation to an external main part, which transmits axial forces from the main part to the tulip flare. In this way, a separation between the rotational movement—executed solely by the main part—and the transmission of the axial forces to the tulip flare—exerted solely by the transmission ring—is achieved. This avoids a large axial force transmission being coupled to a rotational movement of the force-transmitting face if a union nut rotates, which could result in the danger of a material overload and/or component damage because of the high frictional forces and torques resulting therefrom.

Furthermore, according to the present invention, the cone angle of the internal mantle surface of the union element in the hand-tight mounted state is less than or equal to the cone angle of the external mantle surface of the tulip flare. In this way, the contacting conditions according to the present invention may be implemented especially simply in the hand-tight mounted state of the flared screw fitting.

The cone angle of the internal mantle surface of the union element is to be less than the cone angle of the stop face of the connecting piece to achieve the force introduction in the area of the stop face of the connecting piece.

To improve the security against the pipe being torn out of the pipe connection, the internal mantle surface of the transmission body may be provided with a bead projecting in relation to the remaining mantle surface in an area in which it is in contact with the external mantle surface of the tulip flare in the hand-tight pre-mounted state. In the course of further tightening of the flared screw fitting, this bead digs into the tulip flare while deforming it, so that a type of formfitting connection results, which makes pulling out the flared pipe quasi-impossible.

To increase the security of the flared pipe in the screw fitting further, it is suggested according to the present invention that the internal mantle surface of the union element be provided with teeth in an area in which it is out of contact with the external mantle surface in the hand-tight pre-mounted state. This toothed area is to come into contact with the external mantle surface of the tulip flare in the course of the further tightening of the screw fitting and dig into it slightly. In this way, a further face having a formfitting connection between union element and the tulip flare may be achieved.

Finally, it is also provided according to the present invention that in the final mounted state of the screw fitting, both the bead and also the teeth are at least partially dug into the external mantle surface of the tulip flare. The combination of these two security features against unintended tearing out of the pipe is especially effective, particularly because these security mechanisms are active in different sections of the external mantle surface of the tulip flare. If the tulip flare is at least predominantly located in an axial section of the flared screw fitting in which the threaded section of the connecting piece and the union element are engaged with one another, very great rigidity is achieved in the area radially outside the tulip flare, so that large radial deformation forces may be generated and supported.

The present invention is explained in greater detail in the following on the basis of multiple exemplary embodiments of a flared screw fitting which are illustrated in the drawing.

Figure 2A:
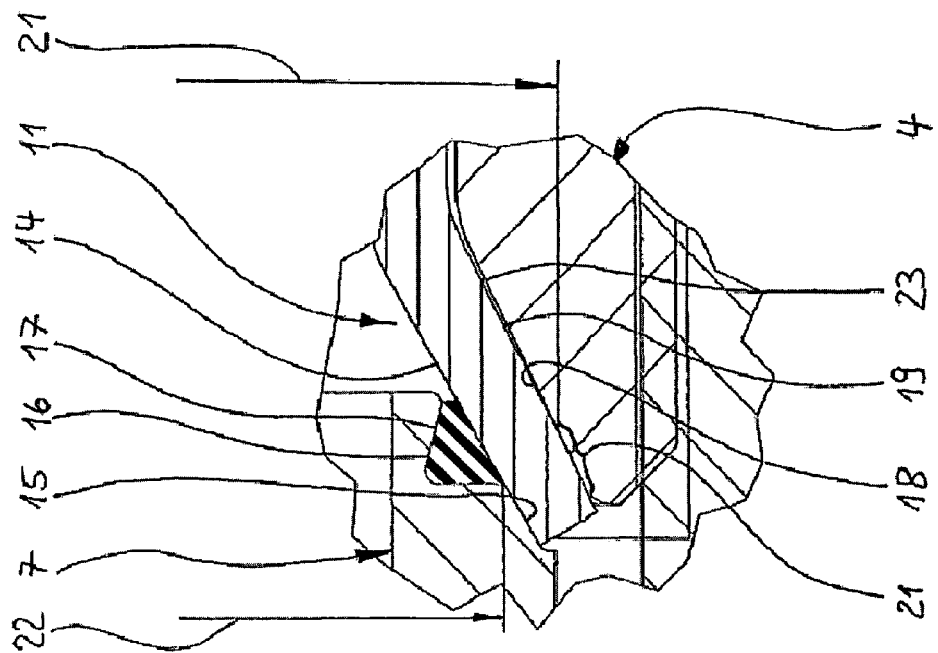
Figure 2:
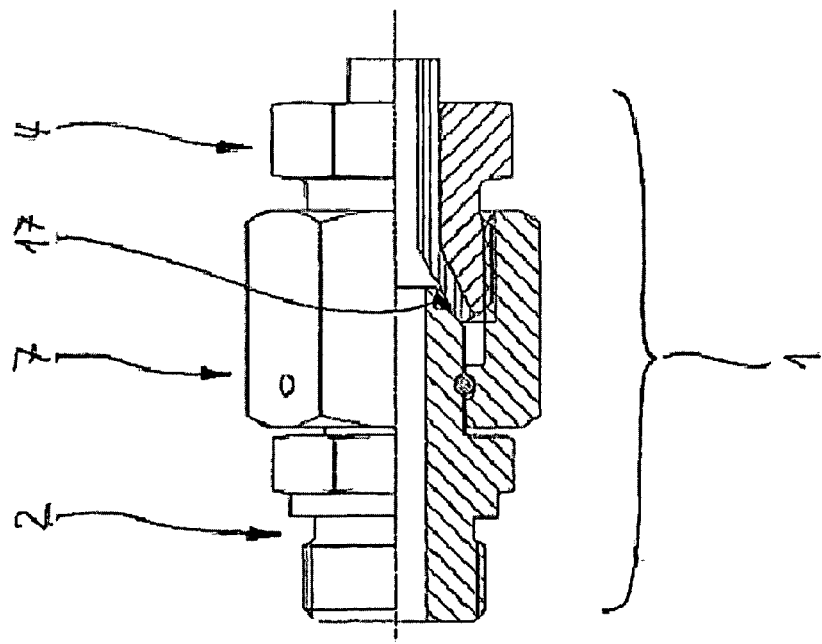
Figure 3A:
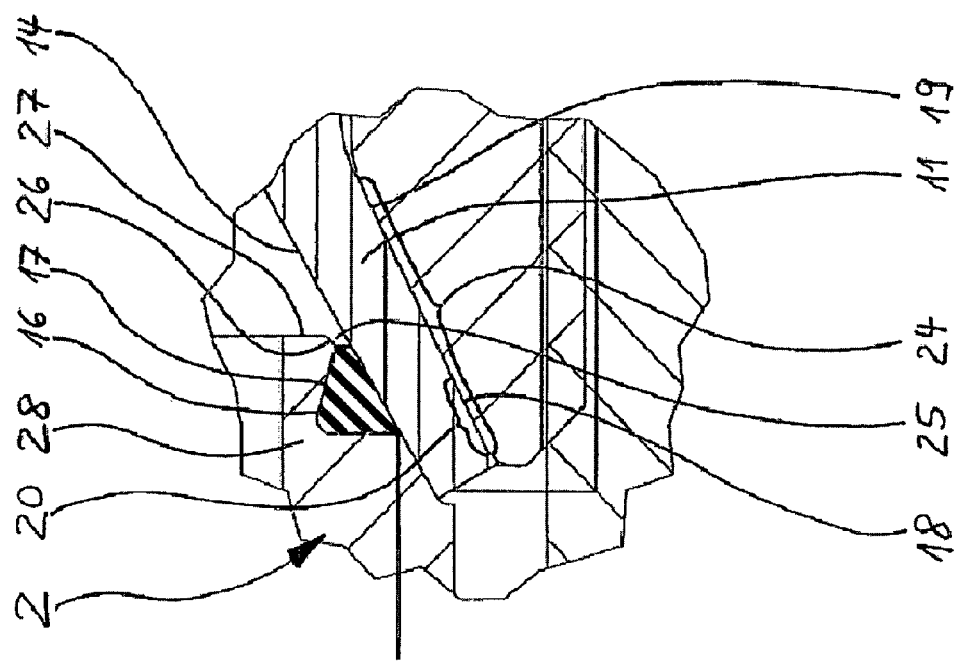
Figure 3:
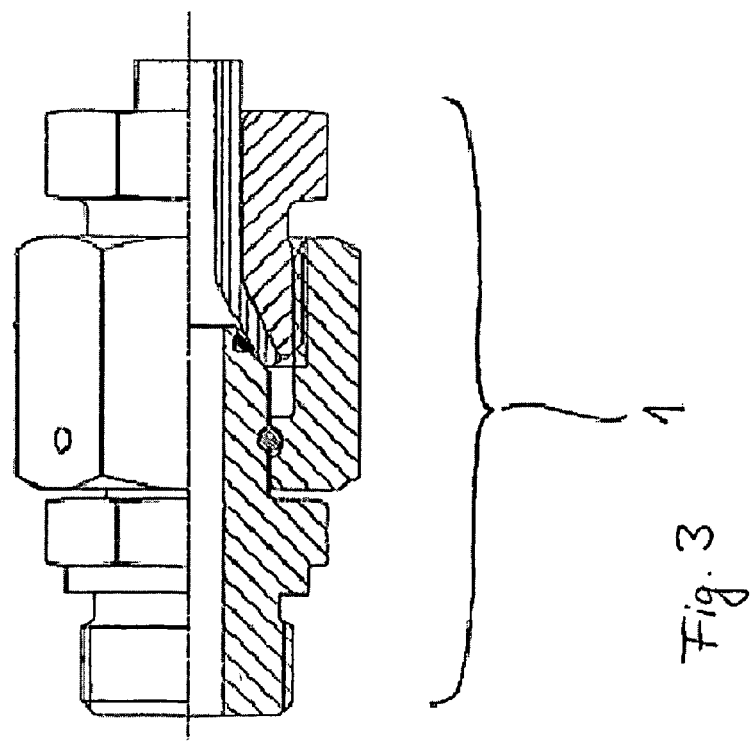
Figure 5A:
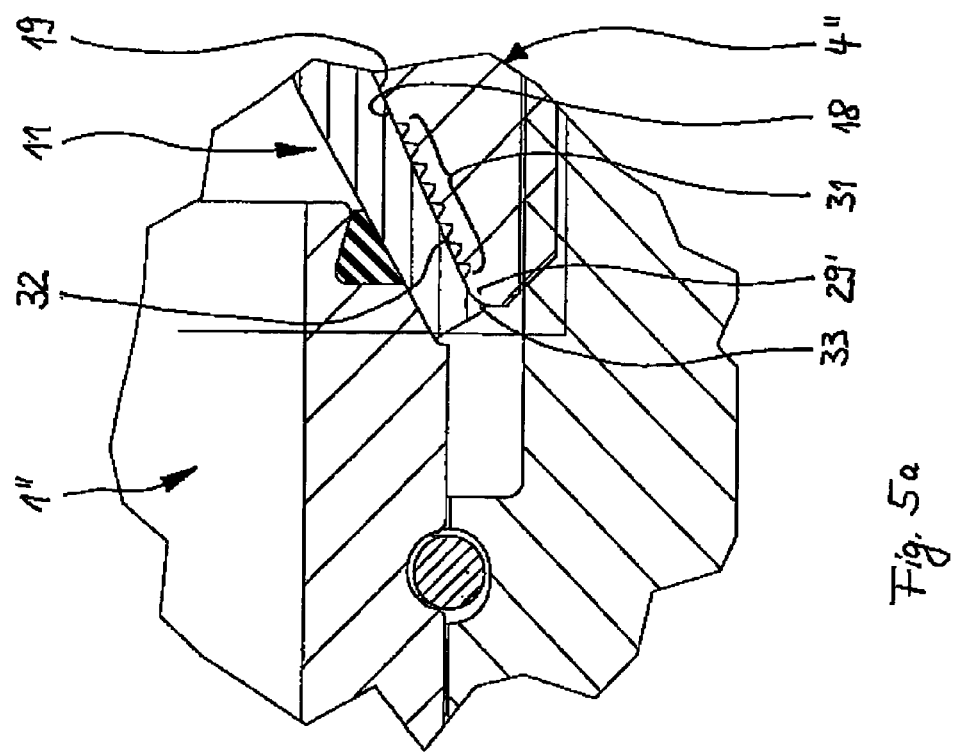
Figure 5:
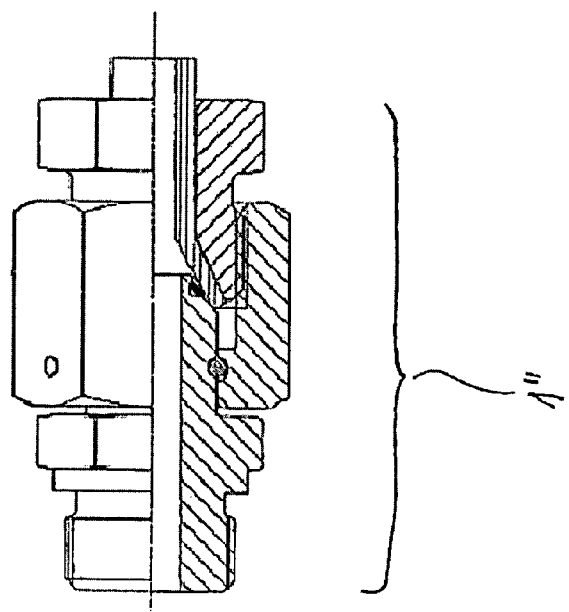
Figure 6A:
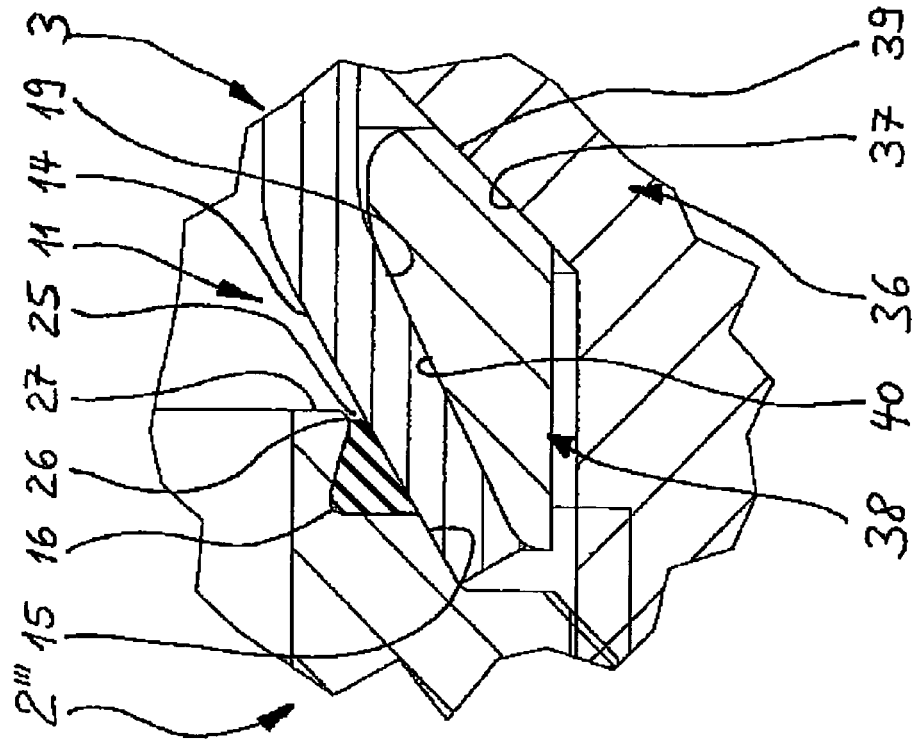
Figure 6:
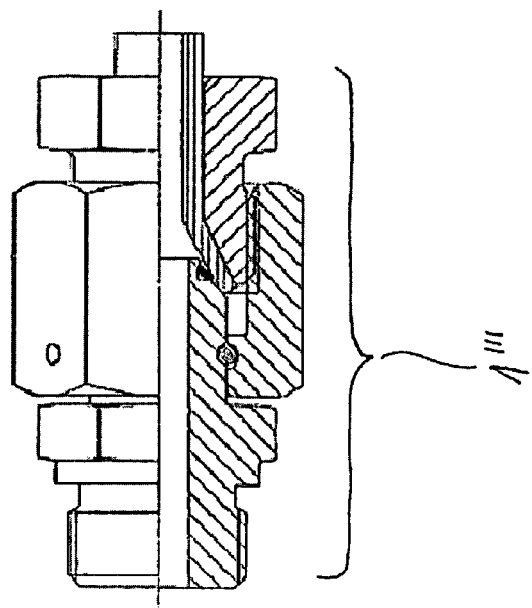

FIG. 1 shows an arrayed illustration of a connecting piece having a union nut, a flared pipe end, and a union screw, FIG. 2 shows a flared screw fitting made of the components in FIG. 1 in the hand-tight pre-mounted state, FIG. 2a shows a detail enlargement of FIG. 2 in the area of the tulip flare, FIG. 3 is like FIG. 2, but in the final mounted state, FIG. 3a is like FIG. 2a, but in the final mounted state, FIG. 4 is like FIG. 3, but having an alternatively shaped union screw, FIG. 4a is like FIG. 3a, but having an alternatively shaped union screw, FIG. 5 is like FIG. 3, but having another alternatively shaped union screw, FIG. 5a is like FIG. 3a, but having another alternatively shaped union screw, FIG. 6 shows a flared screw fitting having a connecting piece having an external thread and a union nut, which works together therewith, having a transmission ring in the final mounted state of the screw fitting, FIG. 6a shows a detail enlargement from FIG. 6 in the area of the tulip flare.

FIG. 1 shows a flared screw fitting 1 according to the present invention, in which the individual components are illustrated arrayed neighboring one another for the sake of clarity. The flared screw fitting 1 comprises a connecting piece 2, a pipe 3, of which only a short end section is shown, and a union screw 4. The connecting piece 2 has an external threaded section 5 on its end shown on the left in the figure, adjoining a hexagon 6, and also a union nut 7 having an internal threaded section 8. This internal threaded section 8 is compatible with an external threaded section 9 of the union screw 4, which also has a hexagon 10 like the connecting piece 2.

One end of the pipe 3 is reshaped (flared) to form a tulip flare 11. The tulip flare 11 has a conical shape and originates from the non-deformed remainder of the pipe 3, whose external diameter is slightly smaller than the internal diameter of the through hole 12 of the union screw 4, so that the union screw 4 is displaceable on the pipe 3. The union nut 7 of the connecting piece 2 is implemented as a so-called twist-on wire connector, an annular, peripheral wire section 13 which is inserted later having half of its cross-section inserted into a semicircular groove in the connecting piece 2 and half inserted into an also semicircular groove in the union nut 7 and thus forming a connection fixed against an axial load, in which the ability of the union nut 7 to rotate in relation to the remaining connecting piece 2 is maintained.

In FIG. 2, the pipe connection is set in the so-called pre-mounted state. For this purpose, the union nut 7 is screwed onto the union screw 4 until no further mounting progress is achievable with the aid of the torque applicable by hand. It may be seen from the enlargement in FIG. 2a that an internal mantle surface 14 of the tulip flare 11 presses against a stop face 15 of the connecting piece 2. The cone angle of the stop face 15 on one side is slightly smaller in practice than the cone angle of the mantle surface 14 on the other side, so that in any case a contact is achieved externally on the stop face 15. A sealing ring 17, which is circular in cross-section in its unloaded starting state (see FIG. 1), inserted into a groove 16 having a triangular cross-section, has already assumed a rounded triangular shape in the pre-mounted state because of the slight pressure which is exerted by the internal mantle surface 14 of the tulip flare 11.

The embodiment according to the present invention particularly comprises the internal mantle surface 18 of the union screw 4 only contacting the external mantle surface 19 of the tulip flare 11 in an area 20 whose smallest diameter 21 is larger than the smallest diameter 22 of the stop face 15 of the connecting piece 2 and/or the largest diameter of the groove 16, i.e., the diameter of the groove edge facing toward the stop face 15. The special contacting conditions may also be recognized very clearly on the basis of the gap 23 existing between the internal mantle surface 18 of the union screw 4 and the external mantle surface 19 of the tulip flare 11, which increases continuously toward the outlet of the tulip flare. The gap results from cone angles of the external mantle surface 19 of the tulip flare 11 on one side and the internal mantle surface 18 of the union screw 4 on the other side which deviate slightly from one another. The angle difference is approximately 1°, but depending on the circumstances of the individual case (diameter of the screw fitting, materials, wall thicknesses of the pipe) may also be up to a few degrees. FIG. 3 shows the pipe connection 1 in the final mounted state. As may be seen from FIG. 3*a*, the final mounted state is achieved when the union screw 4 is in contact over the entire length 24 of its internal mantle surface 18 with the external mantle surface 19 of the tulip flare 11. As a result of further rotation of the union nut 7—starting from the hand-tight pre-mounted state—the union screw 4 digs in in the forward area 20, which was solely in contact with the external mantle surface 19 of the tulip flare 11 in the hand-tight pre-mounted state. It is important that even in the final mounted state, the orientation of the internal mantle surface 14 of the tulip flare remains essentially unchanged, in particular that the gap 25 between the internal mantle surface 14 of the tulip flare 11 and the rounded edge 26 in the transition from the groove 16 into a forward front face 27 of the connecting piece 2 still exists. However, the internal mantle surface 14 of the tulip flare 11 is only deformed so slightly that no force transmission occurs between it and the forward groove edge. The preferably remaining residual gap 25 prevents a pressure strain on the connecting piece 2 in its forward area and thus protects the cross-section 28, which is critical in regard to material damage. The sealing ring 17 is pressed sufficiently solidly into the groove 16 in the final mounted state that the gap 25 also has no negative effects on the tightness of the screw fitting provided.

FIGS. 4 and 4*a* show a variation 1' of the flared screw fitting, in which the union nut 4' is provided on its internal mantle surface 18, in the forward section thereof, i.e., in the area 20', in which it comes into contact with the external mantle surface 18 of the tulip flare 11 in the hand-tight pre-mounted state, with a bead 29, which projects inward in relation to the remaining mantle surface 18. There is a depression 30 between the bead 29 and the conical section of the remaining internal mantle surface 18 of the union screw 4'.

Only the final mounted position of the components to one another is shown in FIGS. 4 and 4*a*. In this position, the bead 29 is dug far enough into the external mantle surface 19 of the tulip flare 11 that the conical section of the internal mantle surface 18 of the union nut 4' is also in contact with the external mantle surface 19 of the tulip flare 11. The very large-area support of the tulip flare thus provided results in a high strength of the pipe connection, in particular, movement of the pipe in the area of the tulip flare is prevented even in the event of greater external transverse force loads on the pipe 3. Furthermore, the dug-in bead 29 prevents the pipe 3 from being able to be torn out from the screw fitting in the event of greater longitudinal force effect with deformation of the tulip flare 11.

An increase of the security in relation to pulling out the pipe 3 may be achieved alternatively (or also cumulatively) to the bead 29 shown in FIGS. 4 and 4*a* with the aid of the embodiment shown in FIGS. 5 and 5*a*. The flared screw fitting 1'' shown therein comprises an alternative union screw 4'', which is provided in an area 32 with an internal mantle surface 18 having teeth 33. While in the hand-tight pre-mounted state of the screw fitting, the internal mantle surface 18 of the union screw 4'' is only in contact in the area of a forward bead 29' with the external mantle surface 19 of the tulip flare 11, digging in occurs in this area upon advancing tightening of the screw fitting, so that an embankment 33 arises in front of the bead 29'—as also in the screw fitting shown in FIGS. 4 and 4*a*—which prevents the pipe 3 from being torn out. In the final mounted state as shown in FIGS. 5 and 5*a*, the tips of the teeth 32 are dug into the external mantle surface 18 of the tulip flare 11 and thus additionally prevent the pipe 3 from being pulled out.

A further alternative flared screw fitting 1''' is shown in FIGS. 6 and 6*a*. In this variation, the connecting piece 2''' has an external threaded section on both sides of the hexagon 6, specifically the external threaded section 5 (as does the connecting piece 2 as well) and the further external threaded section 34, which works together with a fitted internal threaded section 35 of a union nut 36. The union nut 36 has a through hole which is slightly larger than the external diameter of the pipe 3. A transmission ring 38 is located between a conical internal mantle surface 37 of the union nut 36 and the tulip flare 11, which is used as a transmission body for introducing force axially and radially into the connecting piece 2''' together with the union nut 36. While the rear external mantle surface 39 of the transmission ring 38 has the same cone angle as the internal mantle surface 37 of the union nut 36 (namely 45°), the angular difference already explained on the basis of FIG. 2*a* exists in the hand-tight pre-mounted state between the internal mantle surface 40 of the transmission ring 38 and the external mantle surface 19 of the tulip flare 11. This angular difference, which is no longer visible in FIG. 6*a*, is equalized as the screw is tightened further up to the final mounted state in that in the forward area of the transmission ring 38, which is perpendicularly opposite in cross-section to the stop face 15 of the connecting piece 2''', a deformation procedure occurs, which causes the material of the tulip flare 11 to flow slightly, so that after the mounting is completed, essentially the entire external mantle surface 19 of the tulip flare 11 is in contact with the internal mantle surface 40 of the transmission ring 38. There is also a gap 25 here between the rounded edge 26 in the transition of the groove 16 to the forward front face 27 of the connecting piece 2''' and the internal mantle surface 14 of the tulip flare 11, which securely prevents shearing off of the most critical, smallest cross-section of the connecting piece 2''' in the area of the groove base.

Of course, the transmission ring 38 may also be provided with a forward bead corresponding to that in FIGS. 4, 4*a* or teeth corresponding to the embodiment in FIGS. 5, 5*a*.

| List of reference signs | |
|---|---|
| 1, 1', 1'', 1''' | flared screw fitting |
| 2, 2''' | connecting piece |
| 3 | pipe |
| 4, 4', 4'' | union screw |
| 5 | external threaded section |
| 6 | hexagon |
| 7 | union nut twist on wire connector |
| 8 | internal threaded section |
| 9 | external threaded section |
| 10 | hexagon |
| 11 | tulip flare |
| 12 | through hole |
| 13 | wire section |
| 14 | internal mantle surface |
| 15 | stop face |
| 16 | groove |
| 17 | sealing ring |

-continued

List of reference signs

| | |
|---|---|
| 18 | internal mantle surface |
| 19 | external mantle surface |
| 20 | area |
| 21 | diameter |
| 22 | diameter |
| 23 | gap |
| 24 | length |
| 25 | gap |
| 26 | edge |
| 27 | front face |
| 28 | cross-section |
| 29 | bead |
| 30 | depression |
| 31 | area |
| 32 | teeth |
| 33 | embankment |
| 34 | external threaded section |
| 35 | internal threaded section |
| 36 | union nut |
| 37 | internal mantle surface |
| 38 | transmission ring |
| 39 | external mantle surface |
| 40 | internal mantle surface |

The invention claimed is:

1. A flared screw fitting comprising:

a pipe expanded in an end section into a tulip flare; and a connecting piece having a conical stop face situated on an end section, which is adjoined in the direction of a forward front face of the connecting piece by a groove for an elastic sealing ring and which the pipe presses against using an internal mantle surface of the tulip flare, by which, in the final mounted state of the screw fitting, the sealing ring is pressed into the groove, wherein the tulip flare, using a union element engaging an external mantle surface of the tulip flare and interacting via a union element threaded section with a corresponding threaded section on the connecting piece, may furthermore be pressed against the conical stop face of the connecting piece in the course of tightening the screw fitting, wherein in a hand-tight pre-mounted state of the screw fitting, an internal mantle surface of the union element contacts the external mantle surface of the tulip flare only in a first area of the tulip flare, the first area having a first area smallest diameter smaller than any other diameter of the first area of the tulip flare, wherein the conical stop face of the connecting piece has a stop face smallest diameter smaller than any other diameter of the conical stop face, and wherein the first area smallest diameter is larger than the stop face smallest diameter, wherein the conical stop face of the connecting piece is only formed by a face of the connecting piece situated behind the groove for the sealing ring and in the final mounted state a gap exists between the internal mantle surface of the tulip flare and an edge in a transition from the groove to the forward front face of the connecting piece; and wherein the connecting piece is constructed in two pieces, the two pieces comprising an external union nut rotatable around an internal main part, wherein the external union nut and the internal main part are coupled to one another to resist tensile strain via an annular wire section, and wherein the annular wire section engages in the union nut and the internal main part.

2. The flared screw fitting as in claim 1, wherein the union element is a union screw and the union element threaded section is an external threaded section, and wherein the corresponding threaded section on the connecting piece is an internal threaded section.

3. The flared screw fitting according to claim 1, wherein the union element is a union nut provided with an internal threaded section, which works together with an external threaded section of the connecting piece.

4. The flared screw fitting according to claim 3, wherein the union nut is constructed in two pieces and has an internal transmission ring, rotatable in relation to an external main part, which transmits axial forces from the external main part to the tulip flare.

5. The flared screw fitting as in claim 1, wherein the internal mantle surface of the union element has a conical end region adjacent a straight section, the conical end region forming a union element cone angle relative to the straight section of the internal mantle surface of the union element, wherein the tulip flare of the pipe is adjacent a straight section of the pipe, and wherein the external mantle surface of the tulip flare forms a tulip flare cone angle relative to the straight section of the pipe, and wherein the union element cone angle is smaller in the hand-tight mounted state than the tulip flare cone angle.

6. The flared screw fitting according to claim 1, wherein the internal mantle surface of the union element has a conical end region adjacent a straight section, the conical end region forming a union element cone angle relative to the straight section of the internal mantle surface of the union element, wherein the conical stop face forms a stop face cone angle relative to a central axis of the flared screw fitting, and wherein the union element cone angle is smaller than the stop face cone angle.

7. The flared screw fitting according to claim 1, wherein the internal mantle surface is provided, in an area in which the internal mantle surface is in contact with the external mantle surface of the tulip flare in the hand-tight pre-mounted state, with a bead which projects inward in relation to the remaining internal mantle surface.

8. The flared screw fitting according to claim 7, wherein, in the final mounted state, the bead is at least partially dug into the external mantle surface of the tulip flare.

9. The flared screw fitting according to claim 1, wherein the internal mantle surface of the union element is provided with teeth in an area in which the internal mantle surface his out of contact with the external mantle surface of the tulip flare in the hand-tight pre-mounted state.

10. The flared screw fitting according to claim 1, wherein the tulip flare is at least predominantly located in an axial section of the flared screw fitting, in which the threaded sections of the connecting piece and the union element are engaged with one another.

11. The flared screw fitting according to claim 1, wherein the union element is provided in the area of the tulip flare with a continuous conical internal mantle surface.

* * * * *

UNITED STATES PATENT AND TRADEMARK OFFICE
CERTIFICATE OF CORRECTION

| | | |
|---|---|---|
| PATENT NO. | : 8,033,577 B2 | Page 1 of 1 |
| APPLICATION NO. | : 11/786071 | |
| DATED | : October 11, 2011 | |
| INVENTOR(S) | : Kloss et al. | |

It is certified that error appears in the above-identified patent and that said Letters Patent is hereby corrected as shown below:

In particular, in Column 8, line 49, (Line 3 of Claim 9) after the word "surface", please change "his" to correctly read: --is--.

Signed and Sealed this
Twenty-ninth Day of November, 2011

David J. Kappos
*Director of the United States Patent and Trademark Office*